US 9,526,078 B1

(12) United States Patent
Sevindik (10) Patent No.: US 9,526,078 B1
(45) Date of Patent: Dec. 20, 2016

(54) WIRELESS COMMUNICATION SYSTEM TO SYNCHRONIZE A SINGLE FREQUENCY NETWORK

(71) Applicant: Sprint Communications Company L.P., Overland Park, KS (US)

(72) Inventor: Volkan Sevindik, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 121 days.

(21) Appl. No.: 14/605,283

(22) Filed: Jan. 26, 2015

(51) Int. Cl.
| | |
|---|---|
| *H04H 20/71* | (2008.01) |
| *H04W 56/00* | (2009.01) |
| *H04L 12/18* | (2006.01) |
| *H04W 4/06* | (2009.01) |

(52) U.S. Cl.
CPC ........ *H04W 56/001* (2013.01); *H04L 12/1859* (2013.01); *H04L 12/1886* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 8,493,915 B2 | 7/2013 | Chen et al. | |
| 8,509,240 B2 | 8/2013 | Wang et al. | |
| 9,137,083 B1 * | 9/2015 | Lu | H04L 27/2663 |
| 2012/0063447 A1 * | 3/2012 | Tyrrell | H04W 56/00 370/350 |
| 2012/0099468 A1 | 4/2012 | Wang et al. | |
| 2012/0113886 A1 * | 5/2012 | Zhang | H04W 72/005 370/312 |
| 2012/0201184 A1 | 8/2012 | Ai et al. | |
| 2014/0254562 A1 * | 9/2014 | Shim | H04B 1/7073 370/335 |
| 2016/0191287 A1 * | 6/2016 | Conrad | H04L 27/2607 370/343 |

FOREIGN PATENT DOCUMENTS

| | | |
|---|---|---|
| WO | 2010022587 | 3/2010 |
| WO | 2014007692 | 1/2014 |

\* cited by examiner

*Primary Examiner* — Michael J Moore, Jr.

(57) ABSTRACT

A wireless communication system synchronizes a Single Frequency Network (SFN). The wireless communication system includes a multicast server system that transmits multimedia content to wireless access points. The wireless access points determine and transmit SFN transmit time information to the multicast server system. The multicast server system uses the SFN transmit time information to determine if at least one of the wireless access points has a synchronization offset that is greater than a threshold. The multicast server system stops the transmission of the multimedia content to the wireless access points with a synchronization offset that is greater than the threshold.

20 Claims, 6 Drawing Sheets

WIRELESS COMMUNICATION SYSTEM TO SYNCHRONIZE A SINGLE FREQUENCY NETWORK

TECHNICAL BACKGROUND

Wireless communications have become increasingly prominent for sending and receiving information. For example, individuals may utilize a wireless communication device for voice communications, video calls, text messaging, email, research, entertainment, and/or for conducting critical business transactions. Wireless communication devices may use wireless protocols, such as Long Term Evolution (LTE), Evolution Data Optimized (EVDO), Code Division Multiple Access (CDMA), Global System for Mobile communications (GSM), High Speed Packet Access (HSPA), and the like to communicate over wireless communication networks.

Wireless communication networks comprise a collection of wireless access nodes connected together with communication links. A wireless communication network may also be connected to other communication networks. Wireless communication systems, such as cellular voice and data networks, typically include multiple wireless access nodes spread over a geographic area through which wireless communication devices can register and receive wireless access to wireless communication services.

A Single Frequency Network (SFN) is a broadcast network where several access points simultaneously transmit the same signal over the same frequency channel. In an SFN the signal may be amplified and the SFN may maintain overall coverage even in the event of the outage of one or more access points. The wireless access nodes in a wireless communication network may be used to implement an SFN. SFNs are useful to simultaneously transmit the same content to multiple users located in a geographic area. For example, an SFN may stream an audio or video broadcast, like a sporting event. It is important to synchronize the access points, as unsynchronized frames will cause interference in the SFN. Synchronization is also necessary to ensure that as users move around within the coverage area of the SFN, the content is synchronized no matter which access point the user is connected to.

OVERVIEW

Examples disclosed herein provide a system, method, hardware, and software to synchronize a Single Frequency Network (SFN). In one instance, the method includes a multicast server system that transmits multimedia content to wireless access points. The wireless access points determine and transmit SFN transmit time information to the multicast server system. The method further includes the multicast server system using the SFN transmit time information to determine if at least one of the wireless access points has a synchronization offset that is greater than a threshold. The method includes the multicast server system stopping transmission of the multimedia content to the wireless access points with a synchronization offset that is greater than the threshold.

In another example, a wireless communication system synchronizes a Single Frequency Network (SFN). The wireless communication system includes a multicast server system that transmits multimedia content to wireless access points. The wireless access points determine and transmit SFN transmit time information to the multicast server system. The multicast server system uses the SFN transmit time information to determine if at least one of the wireless access points has a synchronization offset that is greater than a threshold. The multicast server system stops transmission of the multimedia content to the wireless access points with a synchronization offset that is greater than the threshold.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
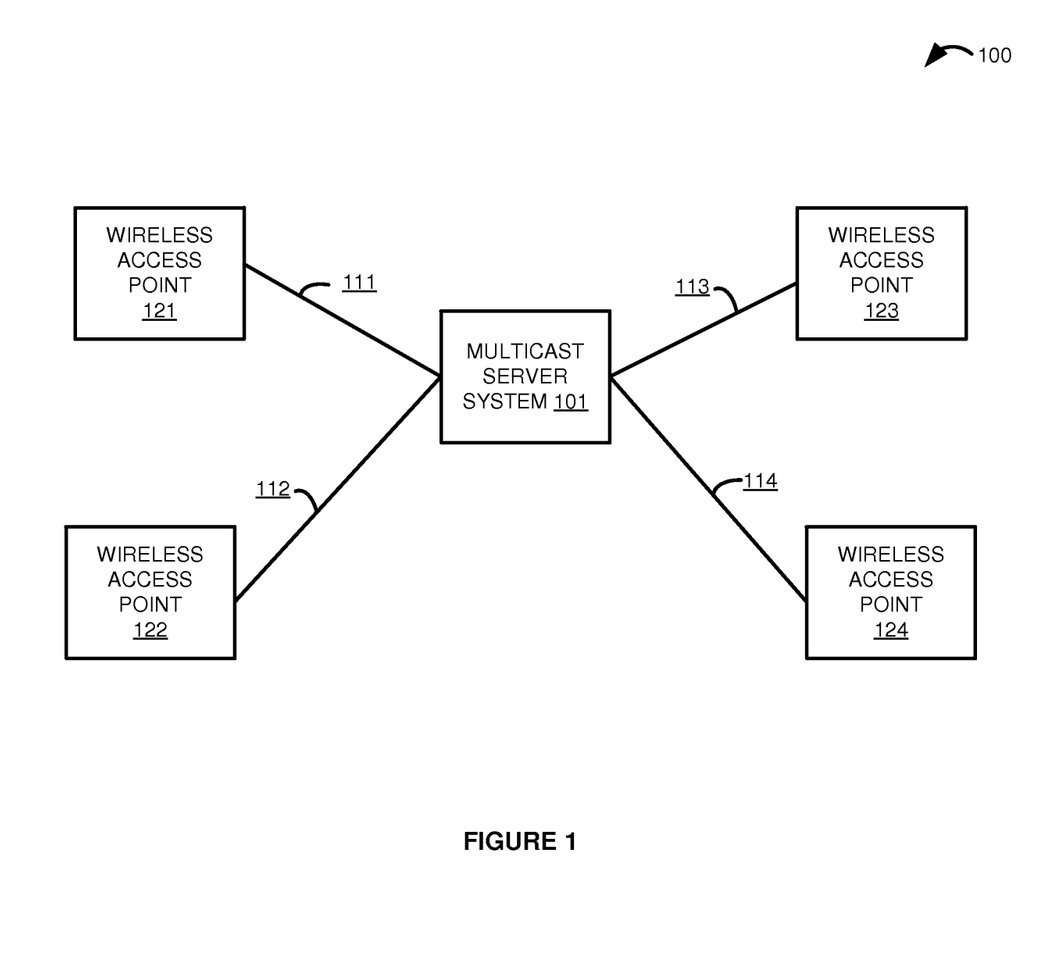
FIG. 1 illustrates a wireless communication system to synchronize a Single Frequency Network (SFN).

FIG. 1 illustrates wireless communication system 100 to synchronize a Single Frequency Network (SFN). Wireless communication system 100 includes multicast server system 101 and wireless access points 121-124. Multicast server system 101 communicates with wireless access points 121-124 over wireless links 111-114, respectively. Wireless links 111-114 may use protocols like Long Term Evolution (LTE), Code Division Multiple Access (CDMA), Global System for Mobile communications (GSM), Universal Mobile Telecommunications System (UMTS), High-Speed Packet Access (HSPA), Evolution-Data Optimized (EV-DO), Worldwide Interoperability for Microwave Access (WiMAX), Wireless Fidelity (WIFI), or some other wireless communication protocol—including combinations thereof. Wireless communication system 100 may include other components not shown for clarity.

In some examples, the SFN comprises a Multimedia Broadcast Multicast Service (MBMS). Examples of multicast server system 101 include a Multicast Coordination Entity (MCE) and a MBMS Gateway (M-GW). Examples of wireless access points 121-124 include base stations, base transceiver stations, femtocell base stations, eNodeBs, WIFI hotspots, WIFI access points, and/or other wireless access nodes—including combinations thereof.

In operation, multicast server system 101 transmits multimedia content to wireless access points 121-124. For example, multimedia content could comprise live video or audio streaming (news, weather, sports, concerts, etc.). In other examples, the multimedia content could be a software update. In yet another example, the multimedia content may be an alert, such as a weather or amber alert.

Wireless access points 121-124 determine and transmit SFN transmit time information to multicast server system 101. In some examples, SFN transmit time information includes buffer status information, a buffer status report, propagation delay information, backhaul delay information, frame transmission information, a Bit Scan Rate (BSR), error rates, and/or other timing information—including combinations thereof.

Multicast server system 101 uses the SFN transmit time information to determine if at least one of wireless access points 121-124 has a synchronization offset that is greater than a threshold. In some examples the transmission delay is in the core network, for instance, from the content provider to the wireless communication network. In other examples, the transmission delay may be in the connection between the backhaul and the wireless access points. In yet other examples, the transmission delay may be the wireless access points themselves. In another example, the transmission delay may be caused by the distance between the wireless access point and the multicast server system. Multicast server system 101 stops the transmission of the multimedia content to the wireless access points with a synchronization offset that is greater than the threshold.

Figure 2:
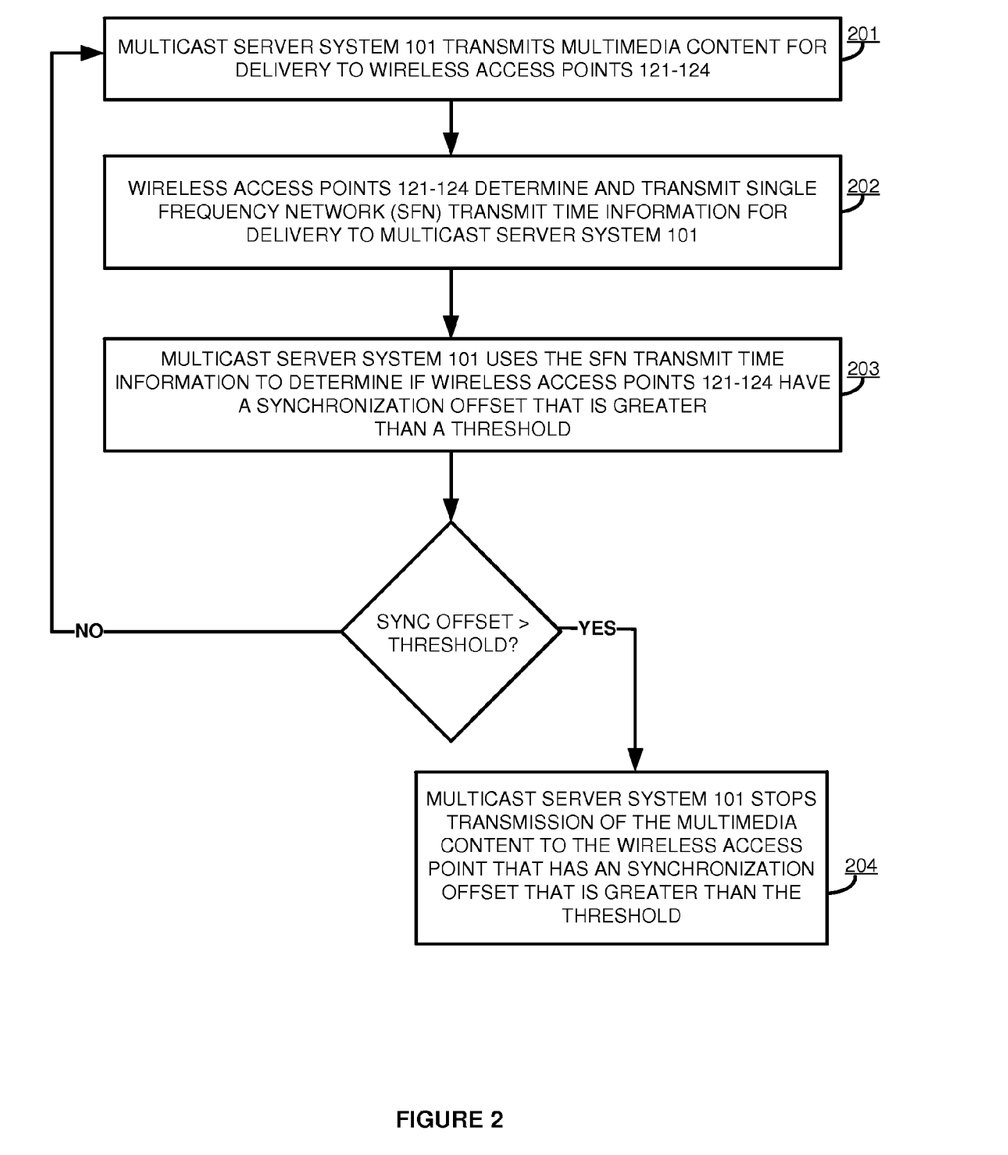
FIG. 2 illustrates the operation of the wireless communication system to synchronize the SFN.

FIG. 2 illustrates the operation of wireless communication system 100 to synchronize an SFN. Multicast server system 101 transmits multimedia content to wireless access points 121-124 (201). For example, the multimedia content may be transmitted in data packets. Wireless access points 121-124 determine and transmit SFN transmit time information to multicast server system 101 (202).

The wireless access points 121-124 may previously have synchronized their clocks, so that the timing information would be synchronized. Although not required, wireless access points 121-124 may also periodically synchronized their clocks. In some examples, SFN transmit time information may include the timestamp of when a data packet was received by the eNodeB. In other examples, the SFN transmit time information may be the timestamp of when a data packet was transmitted from the eNodeB.

Multicast server system 101 uses the SFN transmit time information to determine if at least one of wireless access points 121-124 has a synchronization offset that is greater than a threshold (203). Although not required, the threshold may be determined by calculating the median or mean of the timing information transmitted from wireless access points 121-124. In some examples, multicast server system 101 may also stop transmission of the multimedia content to the wireless access points with a synchronization offset that is outside a specified range. For example, the threshold may be +/−1 second from the mean SFN transmit time. In some examples, the threshold may be increased or decreased depending on the number of wireless access points that have been removed from the SFN. In other examples, the threshold may be increased or decreased based on the number of wireless access points transmitting the multimedia content, to ensure that there are an adequate number of wireless access points transmitting the multimedia content within the coverage area.

Multicast server system 101 stops the transmission of the multimedia content to the wireless access points with a synchronization offset that is greater than the threshold (204). Although not required, after transmission has been stopped to a given wireless access point, multicast server system 101 may transfer an SFN transmit time information request to each wireless access point that has been removed (i.e. the wireless access points that have stopped receiving the multimedia content) from the SFN. In response to the SFN transmit time information request, multicast server system 101 receives updated SFN transmit time information from the removed wireless access points and determines whether the wireless access point has a synchronization offset greater than the threshold. In some examples, the SFN transmit time information request is sent after a specified amount of time. In other examples, the SFN transmit time information request is transmitted when the number of transmitting wireless access points drops below a specified number. In yet other examples, multicast server system 101 may restart transmission to the wireless access points with a synchronization offset greater than a threshold after a specified amount of time. Although not required, multicast server system 101 may periodically transmit a SFN transmit time information request to all wireless access points (active and not active) that are part of the SFN.

Figure 3:
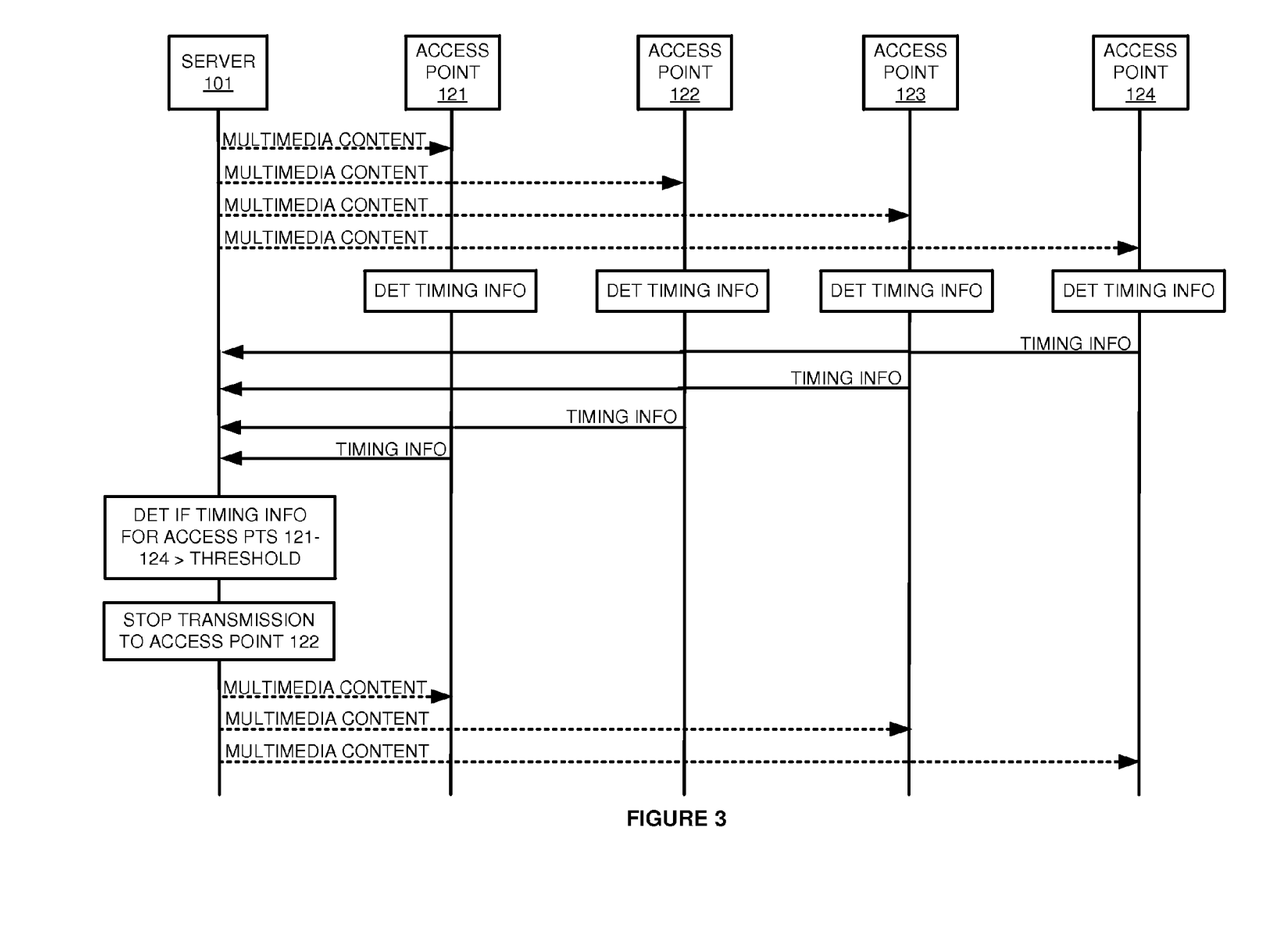
FIG. 3 illustrates the operation of the wireless communication system to synchronize the SFN.

FIG. 3 illustrates the operation of wireless communication system 100 to synchronize an SFN. Multicast server system 101 transmits multimedia content to wireless access points 121-124. Wireless access points 121-124 determine and transmit SFN transmit time information to multicast server system 101. Multicast server system 101 uses the SFN transmit time information to determine if at least one of wireless access points 121-124 has a synchronization offset that is greater than a threshold.

In this example, wireless access point 122 has a synchronization offset greater than the threshold. Multicast server system 101 stops the transmission of the multimedia content to the wireless access point 122. In some examples, the wireless access point to be removed may be faster than the other wireless access points, or have a negative synchronization offset. Although not required, additional multicast server systems may be added to increase the coverage area or reduce delay caused by distance between the multicast server systems and the wireless access points.

Figure 4:
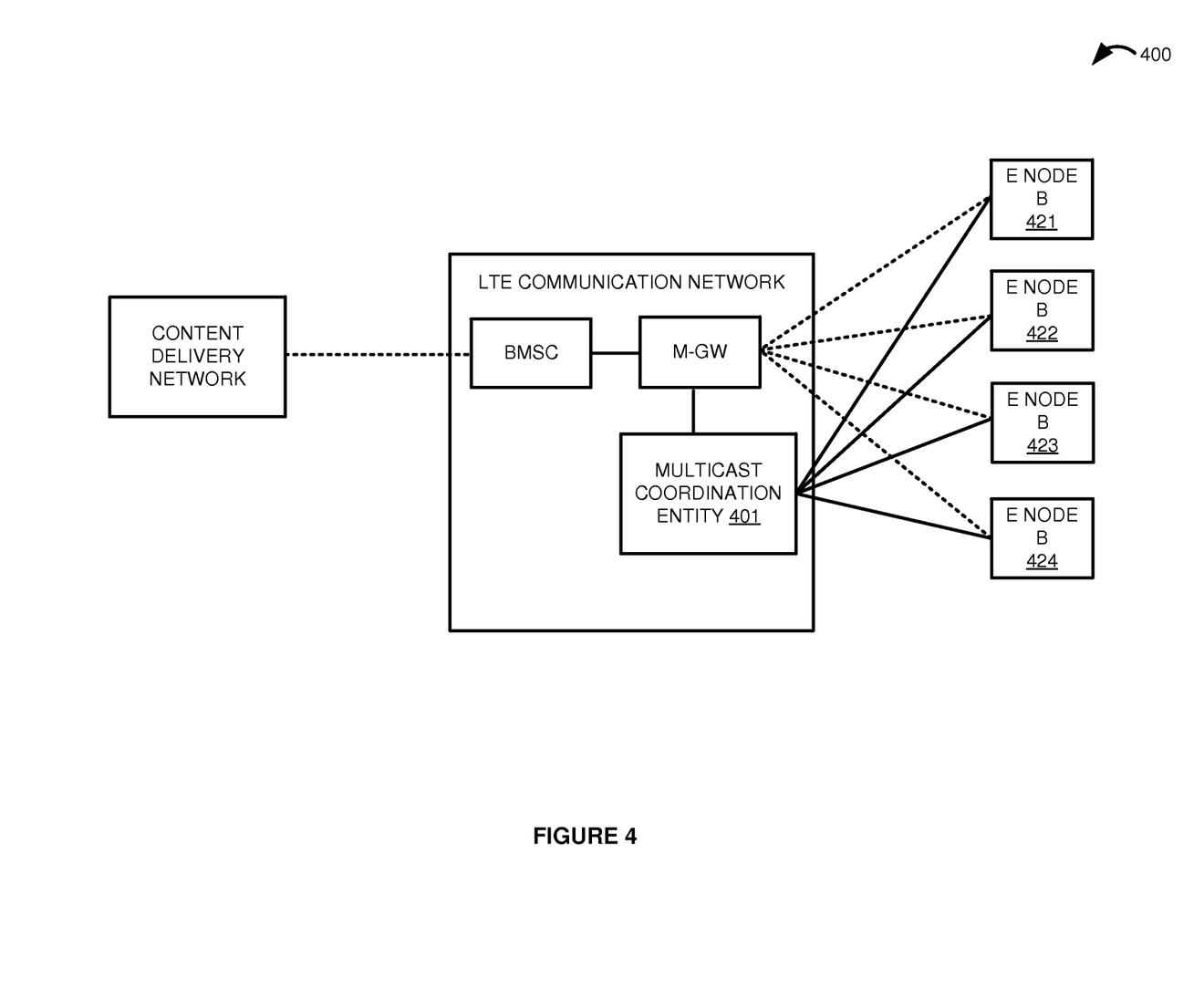
FIG. 4 illustrates a wireless communication system to synchronize an SFN.

FIG. 4 illustrates wireless communication system 400 to synchronize a Single Frequency Network (SFN). Wireless communication system 400 includes a Content Delivery Network (CDN), an LTE communication network, and eNodeBs 421-424. The LTE communication network includes a Broadcast Multicast Service Center (BMSC), a MBMS Gateway (M-GW), and Multicast Coordination Entity (MCE) 401. Although shown as a separate entity, MCE 401 could be integrated into the M-GW or eNodeBs 421-424. Other elements of the LTE communication network such as a Serving Gateway (S-GW) and a Mobility Management Entity (MME) have been omitted for clarity.

In operation, a content provider transmits multimedia content to eNodeBs 421-424 over the LTE communication network. ENodeBs 421-424 determine and transmit SFN transmit time information to Multicast Coordination Entity (MCE) 401. MCE 401 uses the SFN transmit time information to determine if at least one of eNodeBs 421-424 has a synchronization offset that is greater than a threshold. MCE 401 stops the transmission of the multimedia content to the eNodeBs with a synchronization offset that is greater than the threshold. Although not required, MCE 401 may send a stop transmission instruction to the M-GW. In some examples, MCE 401 may restart transmission to the removed eNodeBs after a specified amount of time. If the transmission delay is caused by a congested backhaul link to the removed eNodeB, MCE 401 may restart transmission of the multimedia content after the backhaul link is restored.

Figure 5:
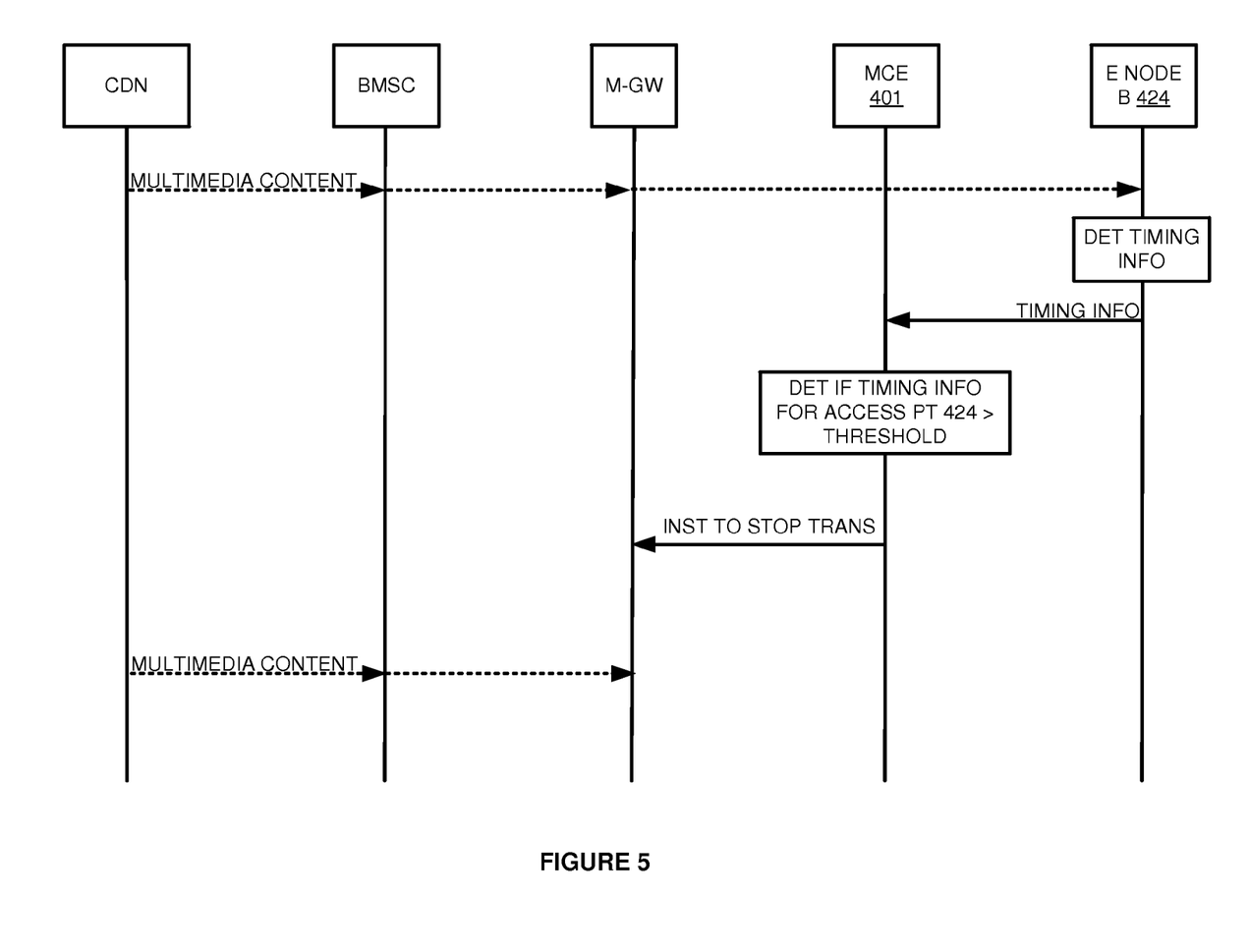
FIG. 5 illustrates the operation of the wireless communication system to synchronize the SFN.

FIG. 5 illustrates the operation of wireless communication system 400 to synchronize an SFN. A content provider transmits multimedia content to eNodeB 424 over the LTE communication network. ENodeB 424 determines and transmits SFN transmit time information to MCE 401. Although not required, MCE 401 may determine the SFN transmit time information rather than receiving it from eNodeB 424.

MCE 401 uses the SFN transmit time information to determine if eNodeB 424 has a synchronization offset that is greater than a threshold. ENodeB 424's synchronization offset is greater than the threshold, and MCE 401 sends a stop transmission instruction to the M-GW. The M-GW stops transmission of the multimedia content to eNodeB 424. MCE 401 or BSMC may send a restart instruction based on the number or percentage of active eNodeBs.

Figure 6:
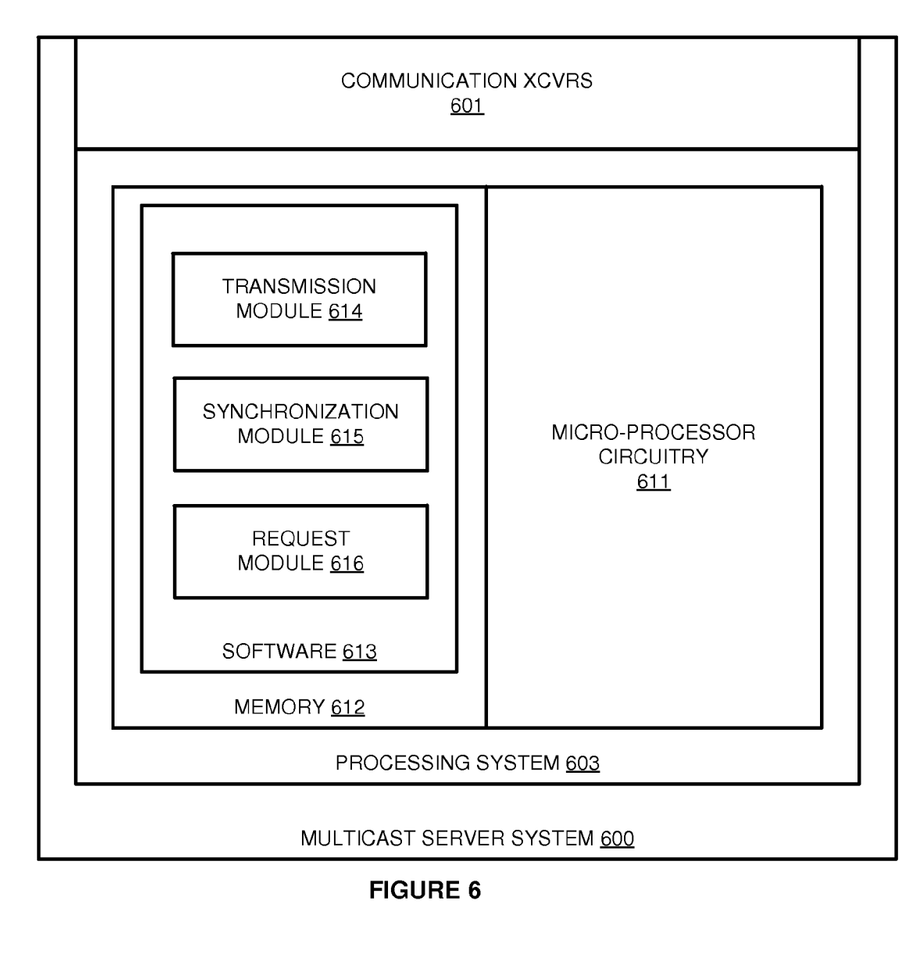
FIG. 6 illustrates an example of a multicast server system to synchronize an SFN.

FIG. 6 illustrates multicast server system 600 to synchronize an SFN. Multicast server system 600 is an example of multicast server system 101 and multicast coordination entity 401, although multicast server system 101 and multicast coordination entity 401 may use alternative configurations. Multicast server system 600 could be a discrete system, a distributed system, and/or could be integrated into other systems.

Multicast server system 600 comprises communication transceivers 601 and processing system 603. Processing system 603 comprises processor circuitry 611 and memory 612 that stores operating software 613. Software 613 includes transmission module 614, synchronization module 615, and request module 616. Processing system 603 is linked to communication transceivers 601. Multicast server system 600 may include other well-known components that are not shown for clarity, such as, servers, computer systems, databases, and power systems.

Communication transceivers 601 comprise a physical communication port, signal processing circuitry, software, and/or some other communication components. Communication transceivers 601 may use various protocols, such as IP, TDM, Ethernet, wireless, or some other network communication format—including combinations thereof. Communication transceivers 601 exchange signaling and other control data with communication nodes as described herein.

Processor circuitry 611 comprises microprocessor and other circuitry that retrieves and executes operating software 613 from memory 612. Memory 612 comprises a non-transitory computer-readable storage medium, such as a disk drive, flash drive, data storage circuitry, or some other memory apparatus. Memory system 612 could be a single device or be distributed across multiple devices. Processor circuitry 611 is typically mounted on one or more circuit boards that may also hold memory 612 and portions of communication transceivers 601.

Operating software 613 comprises computer programs, firmware, or some other form of computer-readable processing instructions. Operating software 613 may include an operating system, utilities, drivers, network interfaces, applications, or some other type of software. When executed by processor circuitry 611, software 613 directs processing system 603 to operate multicast server system 600 as described herein. In particular, transmission module 614 directs processing system 603 to transmit multimedia content for delivery to the wireless access points. Synchronization module 615 directs processing system 603 to use the SFN transmit time information received from each wireless access point to determine if that wireless access point has a synchronization offset that is greater than a threshold. Request module 616 directs processing system 603 to transfer an SFN transmit time information request for delivery to the wireless access points. The request may be sent periodically to all wireless access point receiving the multimedia content. The request may also be transmitted to the wireless access points that have a synchronization offset that is greater than the threshold, in order to determine whether transmission of the multimedia content can be restarted to that wireless access point.

Referring back to FIG. 1, wireless access points 121-124 comprise RF communication circuitry and an antenna. The RF communication circuitry typically includes an amplifier, filter, RF modulator, and signal processing circuitry. Wireless access points 121-124 may also comprise a router, server, memory device, software, processing circuitry, cabling, power supply, network communication interface, structural support, or some other communication apparatus. Wireless access points 121-124 could be a base station, Internet access node, telephony service node, wireless data access point, or some other wireless communication system—including combinations thereof. Wireless access points 121-124 comprise network elements that provide communications services to wireless communication devices. Wireless access points 121-124 may comprise switches, wireless access nodes, Internet routers, network gateways, application servers, computer systems, communication links, or some other type of communication equipment—including combinations thereof.

Multicast server system 101 comprises a computer system and communication interface. Multicast server system 101 may also include other components such as a router, server, data storage system, and power supply. Multicast server system 101 may reside in a single device or may be distributed across multiple devices. Multicast server system 101 is shown externally to wireless access points 121-124, but multicast server system 101 could be integrated within the components of wireless access points 121-124. Multicast server system 101 could be a mobile switching center, network gateway system, Internet access node, application server, service node, or some other communication system—including combinations thereof.

Wireless links 111-114 use the air or space as the transport media. Wireless links 111-114 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Wireless communication links 111-114 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to synchronize a Single Frequency Network (SFN), the method comprising:
   a multicast server system transmitting multimedia content for delivery to a plurality of wireless access points;
   the plurality of wireless access points determining and transmitting SFN transmit time information for delivery to the multicast server system;
   the multicast server system using the SFN transmit time information to determine if at least one wireless access point of the plurality of wireless access points has a synchronization offset that is greater than a threshold; and
   the multicast server system stopping the transmission of the multimedia content for delivery to the at least one wireless access point of the plurality of wireless access points with the synchronization offset that is greater than the threshold.

2. The method of claim 1 wherein the SFN comprises a Multimedia Broadcast Multicast Service (MBMS).

3. The method of claim 1 further comprising:
   the multicast server system transferring an SFN transmit time information request for delivery to the at least one wireless access point of the plurality of wireless access points with the synchronization offset that is greater than the threshold;
   in response to the SFN transmit time information request, the at least one wireless access point of the plurality of wireless access points with the synchronization offset that is greater than the threshold transferring SFN transmit time information for delivery to the multicast server system; and
   the multicast server system restarting transmission of the media content for delivery to the at least one wireless access point of the plurality of wireless access points with the synchronization offset that is greater than the threshold.

4. The method of claim 1 further comprising the multicast server system restarting transmission of the media content for delivery to the at least one wireless access point of the plurality of wireless access points with the synchronization offset that is greater than the threshold after a specified amount of time.

5. The method of claim 1 wherein the multicast server system comprises a Multicast Coordination Entity.

6. The method of claim 1 wherein the multicast server system comprises a Multimedia Broadcast Multicast Service (MBMS) Gateway (M-GW).

7. The method of claim 1 wherein the SFN transmit time information comprises Buffer Status Report information.

8. The method of claim 1 wherein the SFN transmit time information comprises a difference between a time an M-GW transmits the multimedia content and a time a wireless access point receives the multimedia content.

9. The method of claim 1 wherein the SFN transmit time information comprises a difference between a time a Broadcast Multicast Service Center (BMSC) receives the multimedia content and a time an M-GW transmits the multimedia content.

10. The method of claim 1 wherein the wireless communication network comprises a Long-Term Evolution (LTE) network.

11. A wireless communication system to synchronize a Single Frequency Network (SFN), the wireless communication system comprising:
    a multicast server system configured to transmit multimedia content for delivery to a plurality of wireless access points;
    the plurality of wireless access points configured to determine and transmit SFN transmit time information for delivery to the multicast server system;
    the multicast server system configured to use the SFN transmit time information to determine if at least one wireless access point of the plurality of wireless access points has a synchronization offset that is greater than a threshold; and
    the multicast server system configured to stop the transmission of the multimedia content for delivery to the at least one wireless access point of the plurality of wireless access points with the synchronization offset that is greater than the threshold.

12. The wireless communication system of claim 11 wherein the SFN comprises a Multimedia Broadcast Multicast Service (MBMS).

13. The wireless communication system of claim 11 further comprising:
    the multicast server system configured to transfer an SFN transmit time information request for delivery to the at least one wireless access point of the plurality of wireless access points with the synchronization offset that is greater than the threshold;
    the at least one wireless access point of the plurality of wireless access points with the synchronization offset that is greater than the threshold configured to transfer SFN transmit time information for delivery to the multicast server system; and
    the multicast server system configured to restart transmission of the media content for delivery to the at least one wireless access point of the plurality of wireless access points with the synchronization offset that is greater than the threshold.

14. The wireless communication system of claim 11 wherein the multicast server system is configured to restart transmission of the media content for delivery to the at least one wireless access point of the plurality of wireless access points with the synchronization offset that is greater than the threshold after a specified amount of time.

15. The wireless communication system of claim 11 wherein the multicast server system comprises a Multicast Coordination Entity.

16. The wireless communication system of claim 11 wherein the multicast server system comprises a Multimedia Broadcast Multicast Service (MBMS) Gateway (M-GW).

17. The wireless communication system of claim 11 wherein the SFN transmit time information comprises Buffer Status Report information.

18. The wireless communication system of claim 11 wherein the SFN transmit time information comprises a difference between a time an M-GW transmits the multimedia content and a time a wireless access point receives the multimedia content.

19. The wireless communication system of claim 11 wherein the SFN transmit time information comprises a difference between a time a Broadcast Multicast Service Center (BMSC) receives the multimedia content and a time an M-GW transmits the multimedia content.

20. The wireless communication system of claim 11 wherein the wireless communication network comprises a Long-Term Evolution (LTE) network.

\* \* \* \* \*